C. M. HAYNES.
ALINING DEVICE FOR SPECTACLE AND EYEGLASS MOUNTINGS.
APPLICATION FILED OCT. 3, 1914.

1,219,396. Patented Mar. 13, 1917.

Witnesses:
Hugo B Polson
William P Johnson

Inventor
Charles M. Haynes,
By his Attorney
J. S. Dunham

UNITED STATES PATENT OFFICE.

CHARLES M. HAYNES, OF CHILLICOTHE, OHIO.

ALINING DEVICE FOR SPECTACLE AND EYEGLASS MOUNTINGS.

1,219,396.  Specification of Letters Patent.  Patented Mar. 13, 1917.

Application filed October 3, 1914. Serial No. 864,838.

*To all whom it may concern:*

Be it known that I, CHARLES M. HAYNES, a citizen of the United States, residing at Chillicothe, in the county of Ross and State of Ohio, have invented certain new and useful Improvements in Alining Devices for Spectacle and Eyeglass Mountings, of which the following is a full, clear, and exact description.

In fitting "rimless" eyeglasses and spectacles it is often, in fact usually, necessary to bend the bridge-piece or other parts of the mounting to "line up" the lenses so that when the glasses are worn the lenses will be in the proper position before the eyes,—at the same distance from the eyes, at the same height, etc. Necessarily this is done after the lenses are fastened in the mounting, with the result that breakage of a lens not infrequently occurs, even when the optician is experienced and careful.

The object of my present invention is to obviate this drawback, and to this end it consists in the provision of unbreakable devices which can be fastened in the mounting in lieu of the lenses, after which the mounting can be bent or otherwise manipulated to line up the devices. The latter are then removed and the lenses put in place, whereupon the glasses are ready for use.

A convenient and effective embodiment is shown in the accompanying drawing, in which—

Figure 1:
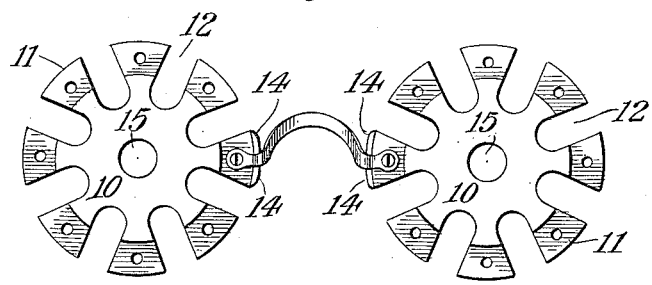
Figure 1 shows in front elevation a pair of the devices fastened in the bridge or nose-piece of a spectacle mounting.

By reference to Fig. 1 it will be seen that in its preferred form each device consists of a plate 10, usually of metal and preferably round in contour. The edge of the device has portions of different thicknesses, corresponding to the standard thicknesses of spectacle and eyeglass lenses, as indicated at 11, Fig. 2, each portion being perforated at the proper distance from the periphery to receive the lens-fastening screw. Preferably these edge-portions are separated by deep notches, 12, thereby providing a series of teeth around the periphery. In the form shown there are eight such teeth, of successively increasing or decreasing thickness, thereby providing for eight different lens-thicknesses.

In using the device the optician, having selected the proper mounting as determined by the usual measurements of nose width, pupillary distance, etc., fits into the bridge or nose-piece the teeth 11 that correspond in thickness to the prescribed lenses, as in Fig. 1, then by means of pliers or other tools so shapes the mounting as to bring the alining devices into the positions that the lenses are to occupy, relatively to each other and to the mounting, when the glasses are worn. He then removes the alining devices and fastens the lenses in place.

The alining devices being of metal or other non-fragile material, the bending of the mounting, the spreading or cramping of the straps 13, etc., can be effected quickly and accurately since no care need be taken to prevent breakage. As indicated in the drawing, particularly in Fig. 2, the thickness of the peripheral portion of the disk varies abruptly, making such portion "stepped," as it were, instead of varying continuously like a flat helix. The "steps" should also be relatively wide at their outer edges, by which I mean that they should not taper outwardly to a point. The disk itself should be rigid, that is, should not collapse while, with the disk in the place of the lens, the spectacle or eyeglass mounting is being bent or otherwise adjusted to fit the wearer.

Preferably the curvature of the edge of the device conforms to the standard lens curvature at the points near the screw holes, so that the arms 14, provided to brace the lens against rocking in its own plane on the fastening screws, can be accurately fitted to the lens as well as the straps 13.

Figure 3:
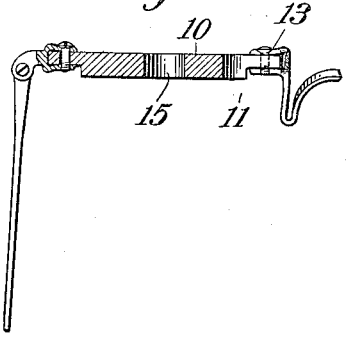
Fig. 3 is a sectional plan view showing one of the devices secured in the strap by which the temple piece is connected to the lens.

For use with spectacle mountings in which the temple-straps require shaping or bending, the device may be constructed in such manner that diametrically opposite teeth are of the same thickness, as indicated in Fig. 3. The number of different lens-thicknesses represented is thus reduced by one-half, in which case one or more additional or supplementary devices can be provided to take care of the thicknesses not found in the first.

The devices may be provided with central apertures 15, to permit the optician to see the pupils of the wearer's eyes during the fitting, thereby making it easier to determine when the mounting is properly adjusted to bring the centers of the lenses exactly in front of the pupils.

Figure 2:
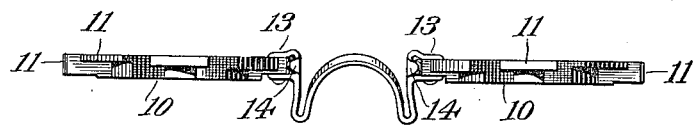
Fig. 2 is a plan view of the same.

Though it is within the spirit of my invention to make the alining devices concavo-convex in form to represent lenses of the meniscus type, commonly known as "toric" lenses, the flat form can be used for the purpose by the exercise of a little judgment and care, as it is only necessary to bend the mounting so that the alining devices are inclined toward the front at a suitable angle to the plane in which they are shown in Fig. 2. This angle is usually about 15°, but the optician will, with a little experience, be able to get the correct angle for the particular lenses in hand, or to come so close to it that very slight adjustment will be necessary after the lenses are substituted for the alining devices.

It is to be understood that the invention is not limited to the device herein specifically illustrated and described, but can be embodied in other forms without departure from its spirit.

I claim:

1. An alining device for spectacle and eyeglass mountings comprising a disk of non-fragile material provided with peripheral portions of different thicknesses, corresponding to the thicknesses of lenses and having their edges shaped to coöperate with the lens-bracing arms of the spectacle or eyeglass mounting.

2. An alining device for spectacle and eyeglass mountings comprising a disk of non-fragile material provided with teeth of different thicknesses, corresponding to the thicknesses of lenses and having their edges shaped to coöperate with the lens-bracing arms of the spectacle or eyeglass mounting.

3. An alining device for spectacle and eyeglass mountings comprising a disk of non-fragile material provided with teeth of different thicknesses, corresponding to the thicknesses of lenses and having perforations to receive lens-fastening screws, the outer edges of the teeth being shaped in conformity to the edge-curvature of the corresponding portions of the lenses.

4. An alining device for spectacle and eyeglass mountings comprising a centrally apertured disk of non-fragile material provided with teeth of different thicknesses, corresponding to the thicknesses of lenses and having perforations to receive lens-fastening screws, the outer edges of the teeth being curved in conformity to the corresponding parts of the lenses.

5. An alining device for spectacle and eyeglass mountings, comprising a rigid non-fragile disk having at its periphery steps of different thicknesses, the outer edges of the steps being wide and curved to coöperate with the lens-bracing arms of spectacle or eye-glass mounting.

In testimony whereof I affix my signature in the presence of two subscribing witnesses.

CHARLES M. HAYNES.

Witnesses:
WILBY G. HYDE,
HAZEL C. HOUGH.

Copies of this patent may be obtained for five cents each, by addressing the "Commissioner of Patents, Washington, D. C."